(12) United States Patent
Bonasia et al.

(10) Patent No.: US 6,307,331 B1
(45) Date of Patent: Oct. 23, 2001

(54) MULTIPLE SENSOR LUX READER AND AVERAGER

(75) Inventors: Gaetano Bonasia, Bronx; David P. Eckel, Eaton's Neck, both of NY (US)

(73) Assignee: Leviton Manufacturing Co., Inc., Little Neck, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,219

(22) Filed: May 6, 1999

Related U.S. Application Data

(60) Provisional application No. 60/085,814, filed on May 18, 1998.

(51) Int. Cl.[7] ............................................. G05F 1/00
(52) U.S. Cl. ..................... 315/294; 315/312; 315/158
(58) Field of Search .................................. 315/219, 293, 315/294, 295, 307, 312, 149, 150, 158, 324, 159

(56) References Cited

U.S. PATENT DOCUMENTS

| | | | |
|---|---|---|---|
| 5,565,855 | * | 10/1996 | Knibbe .......................... 340/825.06 |
| 5,637,964 | * | 6/1997 | Hakkarainen et al. ............. 315/291 |
| 5,703,442 | * | 12/1997 | Notohamiprodjo et al. ........ 315/307 |
| 5,811,940 | * | 9/1998 | Nutzel ................................. 315/291 |
| 5,962,989 | * | 10/1999 | Baker .................................. 315/294 |
| 5,971,597 | * | 10/1999 | Baldwin et al. ................ 364/528.12 |

* cited by examiner

*Primary Examiner*—Don Wong
*Assistant Examiner*—Ephrem Alemu
(74) *Attorney, Agent, or Firm*—Paul J. Sutton

(57) ABSTRACT

A system for sensing and maintaining the light level within an area. The invention comprises multiple lux sensor readers that function to measure the current light level within an area. One or more controllers are used to control the dimming level of each light source in accordance with the readings received from the plurality of lux sensors. The readings are averaged such that over time any extreme readings are averaged out. The light level of the plurality of light sources is adjusted in accordance with the averaged readings. This virtually eliminates areas in the room where the light is too dim or too bright and serves to average out any manufacturing and component tolerance differences between devices. In addition, the invention comprises the optional assignment of a weight factor to each reading or average to further provide the ability to give more importance to certain regions in the room over others thus further assisting in eliminating areas where the light is either too dim or too bright. The system includes control units, controllers, controls for window, skylight, light pipe and shading, HVAC controls, lighting loads and light sensors (lux readers) that are used to construct the lighting control system of the present invention. Readings from the one or more lux sensors are processed by one or more controllers and in response thereto, one or more commands are generated for directing the actions of controllers to which the lighting loads are attached.

46 Claims, 7 Drawing Sheets

| NODE # | SUBNET # | CURRENT LUX | INSTANT AVERAGE | OVERALL AVERAGE |
|---|---|---|---|---|
| | | | | |

30

| NODE # | SUBNET # | CURRENT LUX | INSTANT AVERAGE | OVERALL AVERAGE | WEIGHT FACTOR | WEIGHTED AVERAGE |
|---|---|---|---|---|---|---|
| | | | | | | |
| | | | | | | |
| | | | | | | |

FIG.6

MULTIPLE SENSOR LUX READER AND AVERAGER

REFERENCE TO RELATED APPLICATIONS

This application claims the benefit of U.S. Provisional Patent Application Serial No. 60/085,814, filed May 18, 1998.

FIELD OF THE INVENTION

The present invention relates generally to the field of electrical lighting and more particularly to a system for permitting multiple light sensors to control the light levels in an open area.

BACKGROUND OF THE INVENTION

Today, automation systems are being installed in more and more buildings, including both new construction and in structures that are being rebuilt. The incentives for putting automation systems into a building are numerous. High on the list are reduced operating costs, more efficient use of energy, simplified control of building systems, ease of maintenance and of effecting changes to the systems. Facility managers would prefer to install systems that can interoperate amongst each other. Interoperability is defined by different products, devices and systems for different tasks and developed by different manufacturers that can be linked together to form flexible, functional control networks.

An example of a typical automation system includes lighting controls, HVAC systems, security systems, fire alarm systems and motor drives all possibly provided by different manufacturers. It is desirable if these separate disparate systems can communicate and operate with each other.

Prior art automation systems generally comprised closed proprietary equipment supplied by a single manufacturer. With this type of proprietary system, the installation, servicing and future modifications of the component devices in the system were restricted to a single manufacturer's product offering and technical capability. In addition, it was very difficult or impossible to integrate new technology developed by other manufacturers. If technology from other manufactures could be integrated, it was usually too costly to consider.

An integral part of any automation control system are the sensors and transducers used to gather data on one or more physical parameters such as temperature and motion. One or more sensor functions may be placed in a device and be able to communicate with one or more control units, i.e., processing nodes, on the control network.

In many situations, it is desirable to control the amount of light provided in a given area. Large areas require many individual light sources to provide light coverage for the entire area. Typically, the light sources are either all controlled together or are grouped together into large groups where each group can be controlled. This method of controlling the light sources does not permit fine-tuning of the light level of individual areas within the larger area to be illuminated.

The level of light may be controlled by a light sensor that measures light in units of lux. Typically, the readings from the lux sensor ultimately control the level of light in an area. The disadvantage, however, of this is that in large areas, the reading from the lux sensor would realize a light level in one area of the room without taking into account other areas of the same room. This causes the light level to be either dimmed or too bright in one or more areas.

SUMMARY OF THE INVENTION

The present invention is a system for maintaining the light level within an area. The invention comprises multiple lux sensor readers that function to measure the current light level within a finite area. One or more controllers are used to control the dimming level of each light source in accordance with the readings received from the plurality of lux sensors. The readings are averaged such that over time the extreme readings are averaged out. The light level of the plurality of light sources is adjusted in accordance with the averaged readings. This virtually eliminates areas in the room where the light is too dim or too bright. It also addressees the manufacturing and component tolerance variances that occur between each device.

In addition, the invention comprises the optional assignment of a weight factor to each reading or average to further provide the ability to give more importance to certain regions in the room over others thus further assisting in eliminating areas where the light is either too dim or too bright. For example, offices that are located along a wall having windows or those offices near a skylight where a lot of natural light enters, the ambient light reading units can be linked, averaged or weighted separately from those ambient reading devices in other areas of the office.

The system includes control units, lighting and HVAC controllers, mechanical, electrical and chemical window, skylight and shading controls, lighting loads and light sensors (lux readers) that are used to construct the lighting control system of the present invention. Readings from the one or more lux sensors are processed by one or more controllers and in response thereto, one or more commands are generated for directing the actions of controllers to which the lighting loads are attached.

There is provided in accordance with the present invention a system for measuring and controlling the level of light in an area comprising a plurality of lux sensors adapted to communicate over an automation system network, a plurality of lighting loads for illuminating one or more regions of the area and control means adapted to receive lux readings transmitted from the plurality of lux sensors via the automation system network, the control means adapted to store the lux readings in a database maintained therein and to average the lux readings so as to control the light output of the plurality of lighting loads in response thereto.

The automation system network may comprise the LonWorks automation system or CEBus automation system. The plurality of lighting loads may comprise one or more relay lighting loads, 0–10 V lighting loads, triac loads, dimmer loads, incandescent loads, fluorescent loads, natural lighting loads or 4–20 mA driver loads. In addition, the database comprises a plurality of fields for storing the following information: node ID, current lux reading, average lux reading.

There is also provided in accordance with the present invention a system for measuring and controlling the level of light in an area comprising a plurality of lux sensors adapted to communicate over an automation system network, a plurality of lighting loads adapted to communicate over the automation system network, the plurality of lighting loads for illuminating one or more regions of the area and control means adapted to receive lux readings transmitted from the plurality of lux sensors via the automation system network, the control means adapted to store the lux readings in a database maintained therein, assign a weight factor to readings received from each lux sensor, average the weighted lux readings so as to control the light output of the plurality of lighting loads in response thereto, the plurality of lighting loads controlled by the control means via the automation system network.

There is further provided in accordance with the present invention a system for measuring and controlling the level of light in an area comprising a plurality of lux sensors adapted to communicate over an automation system network, a plurality of lighting loads for illuminating one or more regions of the area and load controller means adapted to connect to and control the operation of the plurality of lighting loads, control means adapted to receive lux readings transmitted from the plurality of lux sensors via the automation system network, the control means adapted to store the lux readings in a database maintained therein, assign a weight factor to readings received from each lux sensor and to average the weighted lux readings so as to control the light output of the plurality of lighting loads in response thereto, the control means adapted to generate control messages for transmission to the load controller means via the automation system network.

BRIEF DESCRIPTION OF THE DRAWINGS

The invention is herein described, by way of example only, with reference to the accompanying drawings, wherein:

FIG. 6 is a diagram illustrating a second table structure for storing light sensor data including weighting factors and averages;

DETAILED DESCRIPTION OF THE INVENTION

The present invention is a system for maintaining the light level at a specified intensity within a specific area. The invention comprises multiple lux sensor readers that together function to measure the current light level within a certain region or area. It also functions to average out the differences due to manufacturing and component tolerances. One or more controllers are used to control the dimming level of each light source in accordance with the readings received from the plurality of lux sensors. The readings are averaged such that over time the extreme readings are averaged out. The light level of the plurality of light sources is adjusted in accordance with the averaged readings. This virtually eliminates areas in the room where the light is too dim or too bright.

Figure 1:
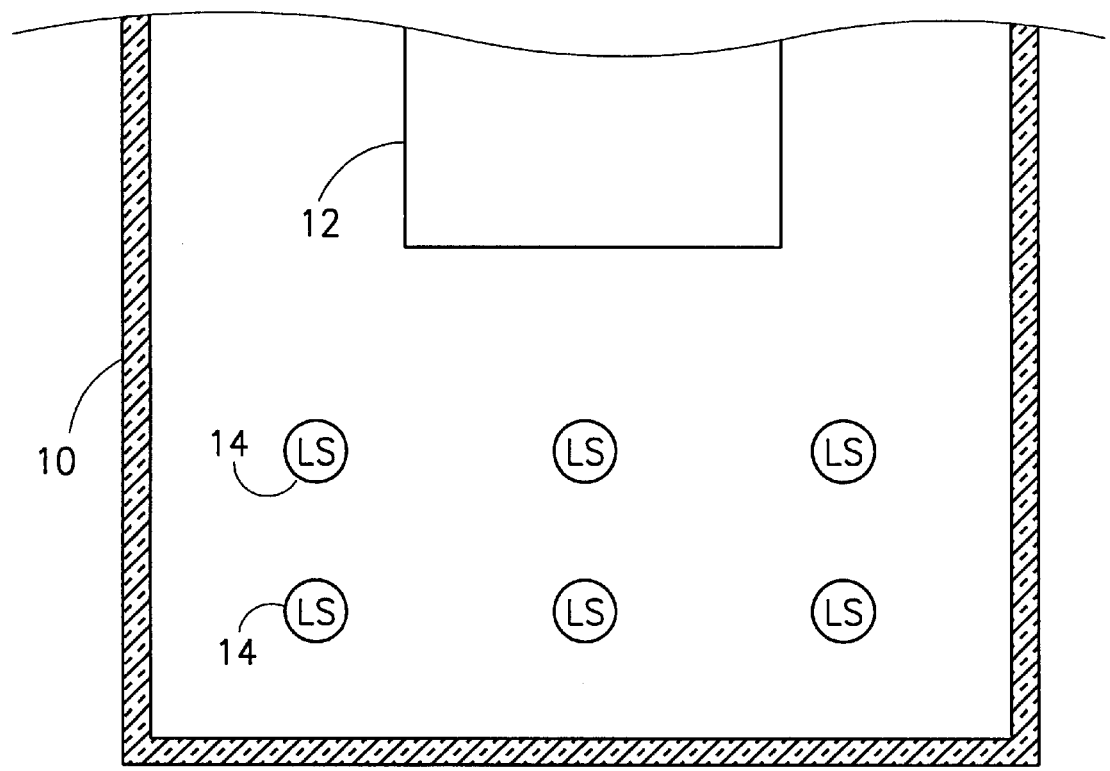
FIG. 1 is a top plan view illustration of the layout of an interior area utilizing a plurality of light sensors.

A top plan view illustration of the layout of an interior area utilizing a plurality of light sensors is shown in FIG. 1. The area whose light level is to be monitored is defined as the region within the outer wall 10. An interior wall is represented by wall 12. The space between the inner wall 12 and outer wall 10 is relatively large. The light level within this area cannot be controlled well using a single light sensor. Thus, multiple light sensors 14 have been strategically placed in the interior space to effectively monitor the interior area. The light sensors may also be located exterior to the building, on the building and/or on the exterior side of the window or skylight shades. Each light sensor is represented by a circle with the letters LS within. Note that six lux sensors are shown for illustrative purposes only. A system may comprise any number of lux sensors depending on the resolution desired and the size of the area to be monitored/illuminated.

Each of the light sensors 14 is coupled to a controller via an automation network such as LonWorks, CEBus, etc. In accordance with the invention, the controller functionality can be part of the sensor or devices itself or, in the alternative can a separate entity. The sensors and controllers are also connected to windows, skylights, light pipes, shades and other related devices for controlling the artificial light and natural light in the room or area. These natural lighting systems and components, such as windows, skylights, light pipes and shades, may be constructed using various forms including but not limited to fiber optic, mechanical, electrical and chemical means. For illustrative purposes, the invention is described using LonWorks as an example. Note, however, that one skilled in the art can easily apply the principles of the present invention to other automation systems as well.

The controllers receive the lux level readings from the light sensors and in response thereto, calculate the brightness levels of the various lighting loads (not shown in FIG. 1) distributed within the area whose illumination is to be controlled/monitored.

Figure 2:
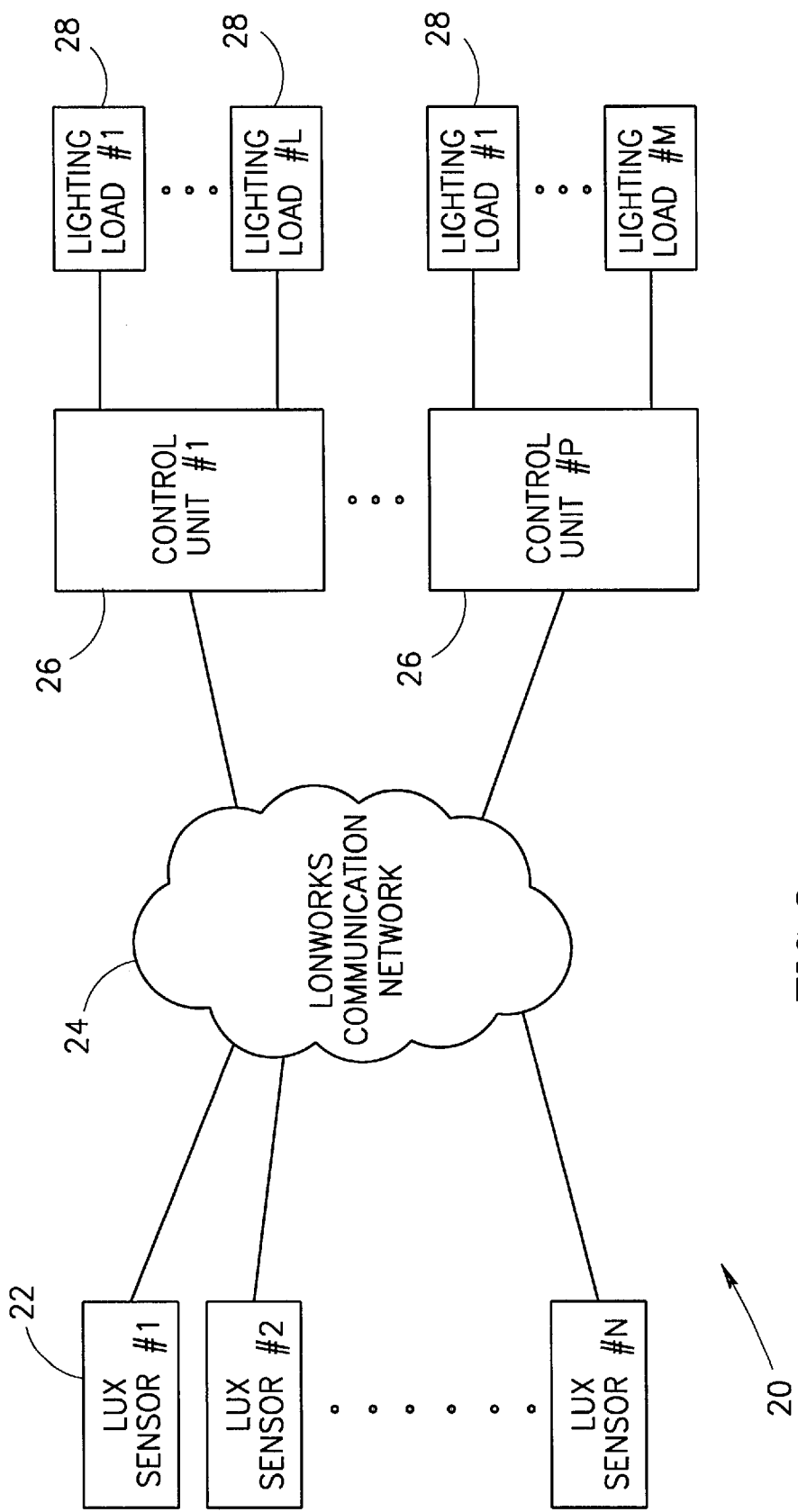
FIG. 2 is a block diagram illustrating a first embodiment of an automation system comprising a plurality of lux sensors, control units and lighting loads.

A block diagram illustrating a first embodiment of an automation system comprising a plurality of lux sensors, control units and lighting loads is shown in FIG. 2. The system, generally referenced 20, comprises a plurality of lux sensors 22 labeled lux sensor #1 through lux sensor #N placed strategically around the area whose light level is to be monitored. Each of the light sensors is capable of communicating over an automation system such as LonWorks. Each lux sensor 22 is coupled to a communications network 24 via any suitable means such as twisted pair, RF, IR, optical fiber, coax, etc.

Also coupled to the communication network 24 are one or more control units 26 labeled control unit #1 through control unit #P. The lux sensors 22 are bound to the control units such that each control unit either receives lux sensor data from each sensor or from groups of lux sensors. Two or more lux sensors can be grouped together to form a subnet. The plurality of lux sensors can be divided into a plurality of subnets. It is assumed that each control unit is adapted to handle a finite number of lighting loads 28. Thus, control unit #1 is coupled to lighting loads #1 through lighting load #L and control unit #P is coupled to lighting loads #1 through lighting load #M. Note that the lighting loads may comprise any combination of relay, triac, dimming, switching, incandescent or fluorescent type loads, 4–20 mA and/or 0–10 V type loads as well as natural lighting controls such as windows, skylights, light pipes and shades.

The control unit 26 functions to receive data from one or more lux sensors and/or other devices and to control one or more lighting loads in response thereto. The operation of a control unit adapted to operate on over automation system network is described in more detail in U.S. patent application Ser. No. 09/213,497, filed Dec. 18, 1998, entitled "Network Based Electrical Control System With Distributed Sensing And Control," incorporated herein by reference.

In operation, the system is responsive to changes in light level as detected by the plurality of lux sensors 22. Changes in the sensor readings are reflected in the brightness settings of the various lighting loads 28 coupled to the controller units 26. The control units 26 are operative to average the readings received from the lux sensors 22. Depending on the number and placement of lighting loads, a change in the light level detected in a particular region may effect only those lighting loads that are within the same vicinity.

Figures 3, 4:
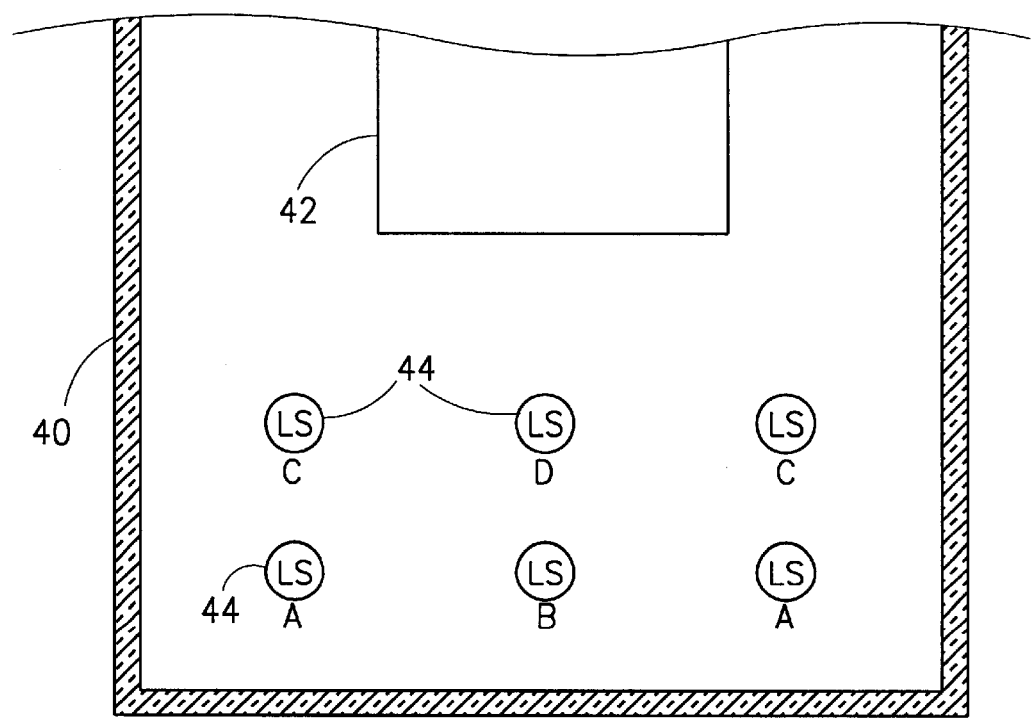
FIG. 3 is a diagram illustrating a first table structure for storing light sensor data.
FIG. 4 is a top plan view illustration of the layout of an interior area utilizing a plurality of light sensors wherein each light sensors has been assigned a weight factor.

A diagram illustrating a first table structure for storing light sensor data is shown in FIG. 3. As described hereinabove, the data generated by the multiple lux sensors is transmitted over the communication network to one or more control units. The control units receiving the lux readings store them in a table, generally referenced 30. Each record in the table, which can be maintained as a database, comprises the following fields: node #, subnet #, current lux reading, instant average and overall average.

The node # is the node ID for that particular lux sensor. The subnet # is the subnet ID the particular lux sensor is part of. The current lux reading holds the latest lux sensor reading received from a particular lux sensor. The instant average is an average of a relatively small number of readings. For example, the instant average may comprise an average over only two readings, i.e., a current reading and a previous reading. The overall average is a running average over a relatively large number of readings. The overall average may represent the average reading over a predetermined time period or over a predetermined number of readings. For example, the overall average may comprise the average of the readings received every ΔT time period, e.g., five minutes. In another example, the overall average may comprise the average of every N readings where N is a count of 10, 20, 50, etc.

In a second embodiment, different regions of the area to be monitored/illuminated can be given different levels of priority. This is achieved by the assignment of a weighting factor to each lux sensor. Note also that the weight factor can also be adapted to take into account the physical location of the sensor. Alternatively, the physical location can be added as another discrete entry to the lux algorithm and the table in FIG. 3.

A top plan view illustration of the layout of an interior area utilizing a plurality of light sensors wherein each light sensors has been assigned a weight factor is shown in FIG. 4. The area whose light level is to be monitored is defined as the region within the outer wall 40. An interior wall is represented by wall 42. The space between the inner wall 42 and outer wall 40 is relatively large. As with the area shown in FIG. 1, the light level within the area of FIG. 4 is assumed to be difficult to control using a single light sensor. Thus, multiple light sensors 44 are placed in the interior space to effectively measure the light level of the entire interior area. The light sensors may also be located exterior to the building, on the building and/or on the exterior side of the window or skylight shades. Note that six lux sensors are shown for illustrative purposes only. A system may comprise any number of lux sensors depending on the resolution desired and the size of the area to be monitored/illuminated.

Each lux sensor 44 is assigned a weighting factor that is represented by the letter placed below each lux sensor symbol. Letters lower in the alphabet are given higher weight than letters higher up. Thus, the lux sensor assigned a weight factor of 'D' is given more weight, i.e., priority, than the lux sensors assigned weights of 'A'. The 'A' lux sensors in the lower corners have been assigned the lowest weight factor as they are the nearest window, assuming there are windows along the outer wall 40. The 'B' lux sensor in between the two corner 'A' sensors has a higher weight factor then 'A' sensors. The two upper corner 'C' lux sensors have a higher weight factor then 'B' sensors as they are positioned more interior. Lux sensor 'D' has the highest weight factor because it is positioned in an area with the lowest possible lux values since it is in the most interior location of all the sensors.

Figure 5:
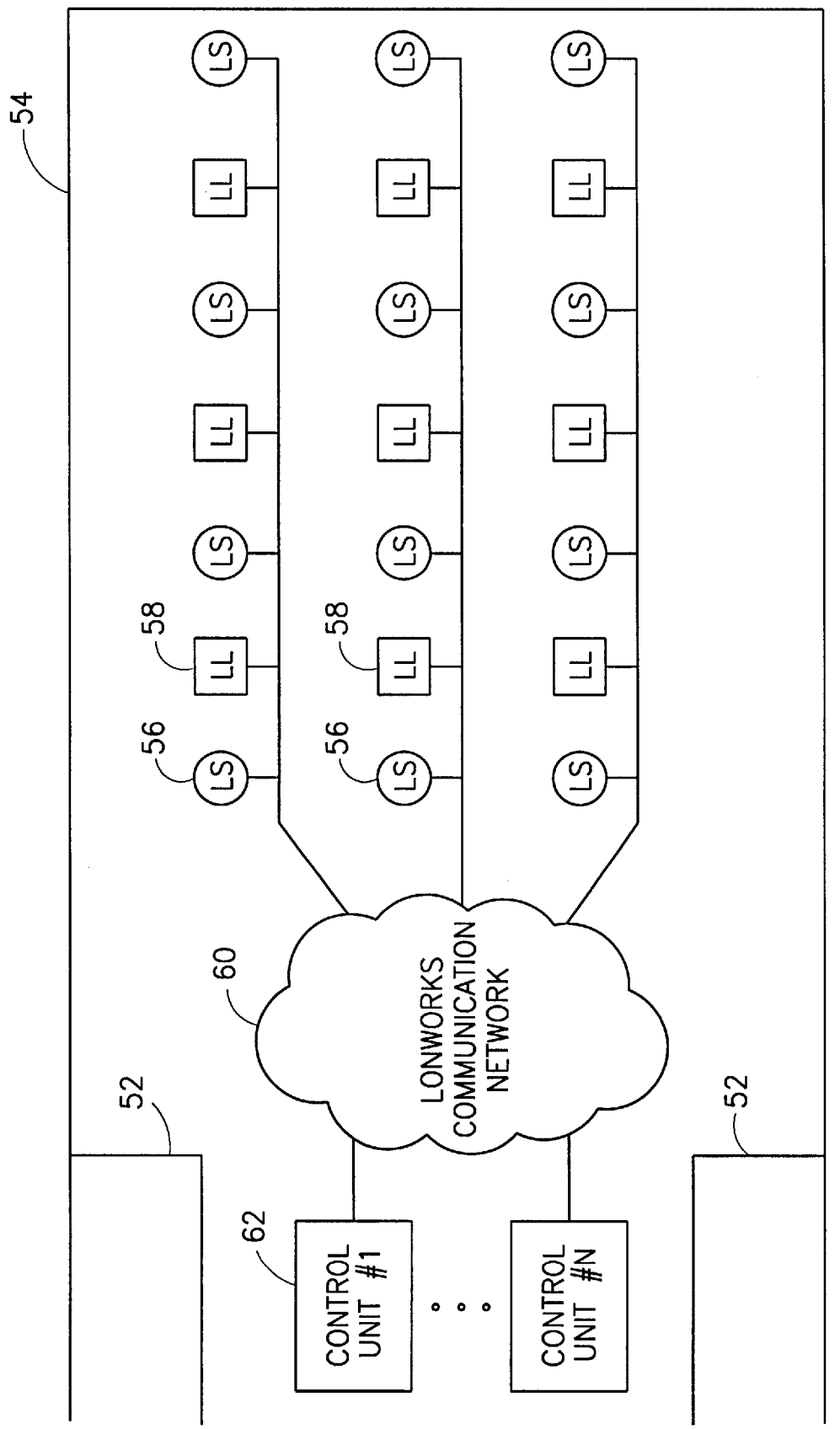
FIG. 5 is a block diagram illustrating a second embodiment of an automation system comprising a plurality of control units, light sensors and lighting loads.

A block diagram illustrating a second embodiment of an automation system comprising a plurality of control units, light sensors and lighting loads is shown in FIG. 5. The system, generally referenced 50, comprises a plurality of lux sensors 56, as represented by circles with 'LS' within, that are strategically around the area whose light level is to be monitored. Each of the light sensors is capable of communicating over an automation system such as LonWorks. Each lux sensor 56 is coupled to a communications network 60 via any suitable means such as twisted pair, RF, IR, optical fiber, coax, etc.

The system 50 also comprises a plurality of lighting loads 58 as represented by squares with 'LL' within. Each lighting load may represent one or more lighting elements and is adapted to function and communicate over automation system network 60 such as LonWorks. The outer wall 54 enclosed an interior space that includes interior enclosed spaces, e.g., inner offices, represented by rectangles 52. Although schematically represented in FIG. 5, the lighting loads 58 and lux sensors 56 are strategically placed within the open area within the outer wall 54. All devices are adapted to communicate over an automation network.

Also coupled to the communication network 60 are one or more control units 62 labeled control unit #1 through control unit #N. Each of the lux sensors 56 and lighting loads 58 are bound (in LonWorks system terms) to the control units 62. Each lux sensor 56 is configured to send lux level readings to one or more control units 62 over the communications network 60. The control units, in response, determine which if any of the lighting loads 58 need to be dimmed or brightened. Any lighting load whose light levels must be modified receives one or more command messages from a control unit. As noted previously, the control unit can be constructed as a device separate from the sensors or can be integrated in the same device housing the sensor elements.

Each control unit 62 either receives lux sensor data from all sensors 56 or from groups of lux sensors. Two or more lux sensors can be grouped together to form a subnet. The plurality of lux sensors can be divided into a plurality of subnets.

The control unit 62 functions to receive data from one or more lux sensors and/or other devices and to control one or more lighting loads 58 in response thereto. Different sensor readings are used due to various factors including the particular location within the room, various manufacturing tolerances and component tolerances. In operation, the system is responsive to changes in light level as detected by the plurality of lux sensors 56. Changes in the sensor readings are reflected in the brightness settings of the various lighting loads 58 coupled over the network 60 to the controller units 62. The control units 62 are operative to average the readings received from the lux sensors 56. Depending on the number and placement of lighting loads, a change in the light level detected in a particular region may effect only those lighting loads 58 that are within the same vicinity.

A diagram illustrating a second table structure for storing light sensor data including weighting factors and averages is shown in FIG. 6. The data generated by the plurality of lux sensors 56 (FIG. 5) is transmitted over the communication network 60 to one or more control units 62. The control units receiving the lux readings store them in a table, generally referenced 70. Each record in the table, which can be maintained as a database, comprises the following fields: node #, subnet #, current lux reading, instant average, overall average, weight factor and weighted average.

The node # is the node ID or address for that particular lux sensor. The subnet # is the subnet ID the particular lux sensor is part of. The current lux reading holds the latest lux sensor reading received from a particular lux sensor. The instant average is an average of a relatively small number of readings. For example, the instant average may comprise an average over only two readings, i.e., a current reading and a previous reading. A new instant average is determined every lux reading sensed.

The overall average is a running average over a relatively large number of readings. The overall average may represent the average reading over a predetermined time period or over a predetermined number of readings. For example, the overall average may comprise the average of the readings received every ΔT time period, e.g., five minutes. In another example, the overall average may comprise the average of every N readings where N is a count of 10, 20, 50, etc.

The weight factor is the weighting assigned to that particular lux sensor. Higher weights are typically assigned to regions within the area to be monitored that have more critical lighting needs. Some examples include areas in an office environment located over a person's desk, over laboratory workbenches, critical work areas, display areas in stores, etc. Areas near windows are typically well lit (at least during the day) and may be assigned lower weights. The weighted average is the average lux reading taking into account the assigned weighting factor. The average used may be the instant average or the overall average.

Note also that the weight factors can also be adapted to take into account the physical location of the sensor. Alternatively, the physical location can be added as another discrete entry to the lux algorithm and the table in FIG. 6.

In addition to the above, total averages can be calculated using the data in a plurality of lux sensor records in the table. For example, all the current lux readings can be averaged into an average current lux reading and the instant average lux over all sensors can be averaged to generate an average instant average.

Figure 7:
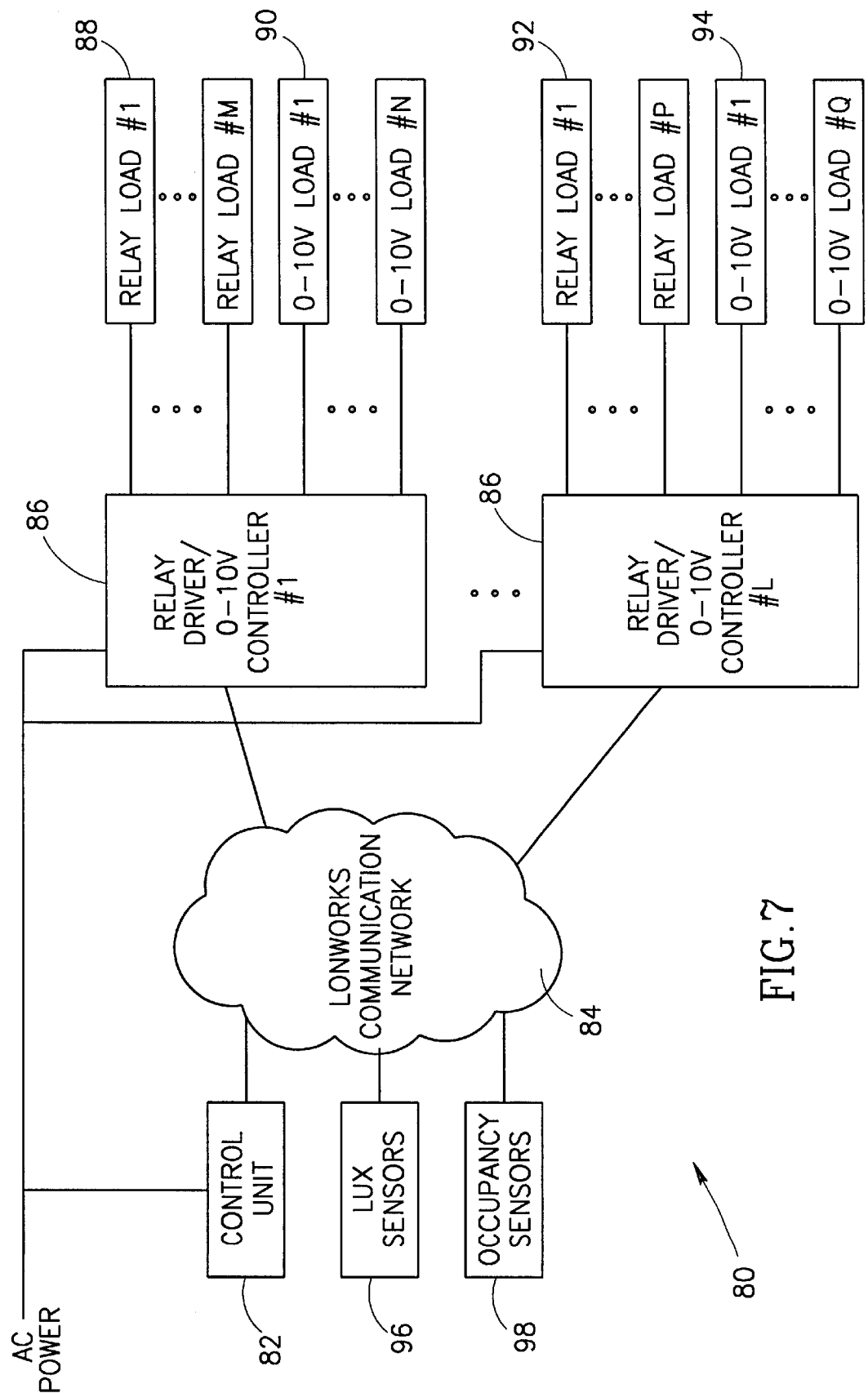
FIG. 7 is a block diagram illustrating a third embodiment of an automation system comprising a plurality of control units, controllers and lighting loads.

In an alternative embodiment groups of lighting loads can be bound into groups and the entire group assigned a single weight factor. Each group can be controlled by one of the control units. This is illustrated in more detail in FIG. 7 which shows a block diagram illustrating a third embodiment of an automation system comprising a plurality of control units, controllers and lighting loads.

In this embodiment, the system, generally referenced 80, comprises an AC power connection, a control unit 82, a communication network 84, a plurality of controllers 86, a plurality of relay loads 88, 92 and a plurality of 0–10 Volt loads 90, 94. The control unit 82 and the controllers 86 are coupled to AC power. The controllers 86 are adapted to drive relays, 0–10 V drivers and/or 4–20 mA drivers. A plurality of controllers are shown labeled relay driver 0–10 V controller #1 through relay driver 0–10 V controller #L.

Each controller 86 is coupled to one or more relay loads 88 labeled relay load #1 through relay load #M and one or more 0–10 V loads 90 labeled 0–10 V load #1 though 0–10 V load #N. Similarly, controller #L is coupled to one or more relay loads 92 labeled relay load #1 through relay load #P and one or more 0–10 V loads 94 labeled 0–10 V load #1 though 0–10 V load #Q.

The system 80 also comprises a plurality of lux sensors 96 and optionally a plurality of occupancy sensors 98. A communications network 84 provides communication means permitting the control unit 82, lux sensors 96, occupancy sensors 98 and the controllers 86 to communication with each other. Readings from the lux sensors 96 are transmitted to the control unit 82 that determines the dimming and brightness levels of the relay and 0–10 V loads. In response to the lux level readings received, the control unit transmits commands over the communication network 84 to one or more of the controllers 86. In turn, the controllers turn one or more relays, triacs or dimmers on or off and/or generate 0–10 V output control signals.

As described previously, a plurality of loads can be bound into groups whereby the entire group is assigned a single weight factor. Each group is individually controlled with each relay output controlling one or more relay loads and each 0–10 V output controlling one or more 0–10 V loads. Multiple groups maybe formed whereby a single lux sensor or occupancy sensor can control more than one group. Each group can have any number of lighting loads wherein all the loads are bound to a single control unit. In addition, there may be some lighting loads within the group that are not controlled.

Figure 8:
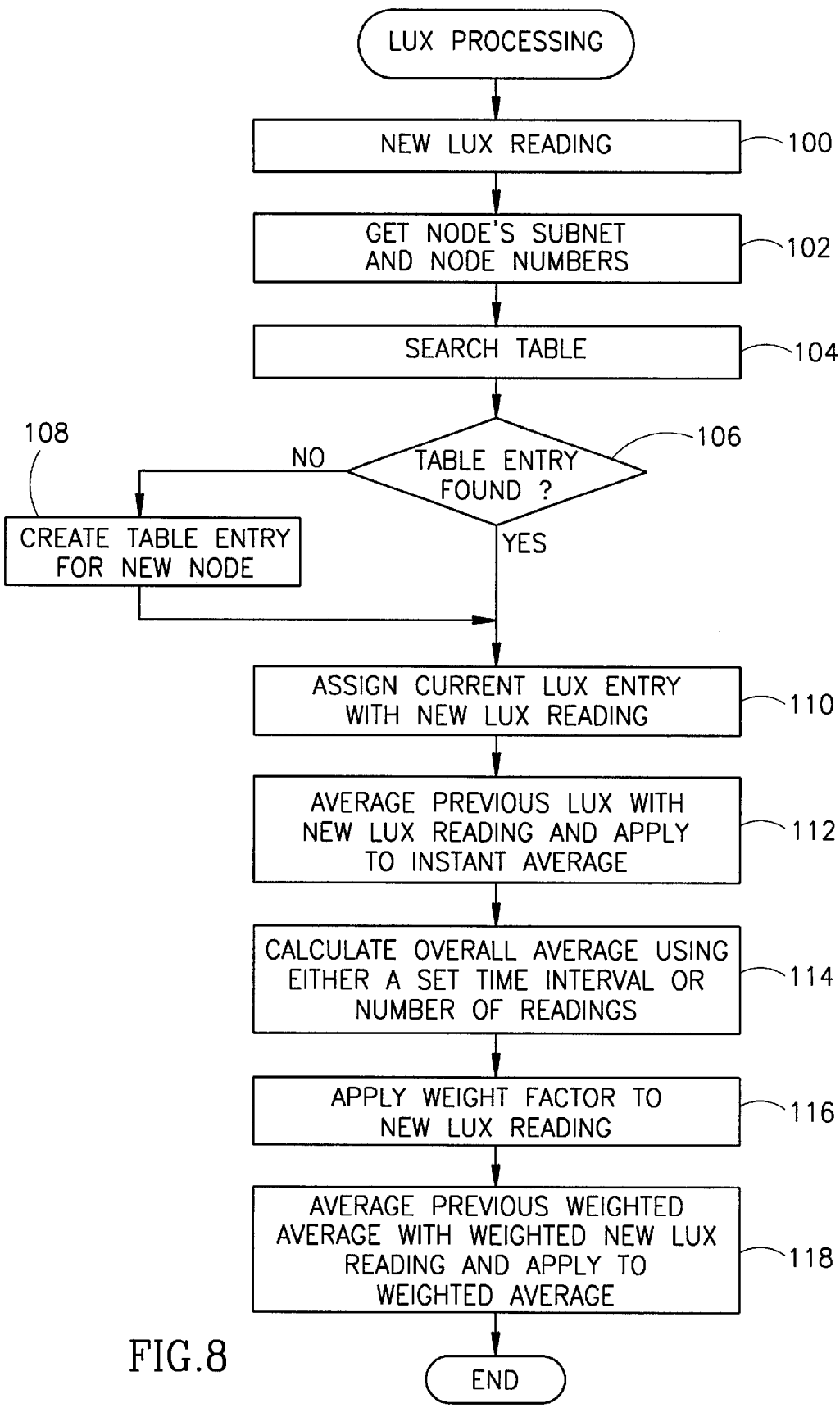
FIG. 8 is a flow diagram illustrating the lux reading processing method of the present invention.

A flow diagram illustrating the lux reading processing method of the present invention is shown in FIG. 8. This method is performed in the controller or control unit that receives the lux readings from the sensors. Initially, new lux readings are received by the controller or equivalent (step 100). The node's subnet and node number are then determined (step 102). The table maintained in the controller is then searched for an entry corresponding to the node number and subnet (step 104). If a table entry is not found (step 106), a new table entry is created for the node (step 108).

The current lux entry in the table is then assigned the new lux reading (step 110). The previous lux reading is then averaged with the current lux reading and the result is applied to the instant average value (step 112). The overall average is then calculated after either a set time interval or a predetermined number of readings (step 114). The weight factor previously assigned is applied to the new lux reading (step 116). Finally, the previous weighted average is averaged with the weighted new lux reading and the result is applied to the weighted average (step 118).

While the invention has been described with respect to a limited number of embodiments, it will be appreciated that many variations, modifications and other applications of the invention may be made.

What is claimed is:

1. A system for measuring and controlling the level of light in an area, comprising:

a plurality of lux sensors for communicating over an automation system network;

a plurality of lighting loads for illuminating one or more regions of said area; and control means for receiving lux readings transmitted from said plurality of lux sensors via said automation system network, said control means for storing said lux readings in a database maintained therein and to average said lux readings so as to control the light output of said plurality of lighting loads in response thereto.

2. The system according to claim 1, wherein said automation system network comprises the Lon Works automation system.

3. The system according to claim 1, wherein said automation system network comprises the CEBus automation system.

4. The system according to claim 1, wherein said plurality of lighting loads comprises one or more relay lighting loads.

5. The system according to claim 1, wherein said plurality of lighting loads comprises one or more 0–10 V lighting loads.

6. The system according to claim 1, wherein said plurality of lighting loads comprises one or more triac loads.

7. The system according to claim 1, wherein said plurality of lighting loads comprises one or more dimmer loads.

8. The system according to claim 1, wherein said plurality of lighting loads comprises one or more incandescent loads.

9. The system according to claim 1, wherein said plurality of lighting loads comprises one or more fluorescent loads.

10. The system according to claim 1, wherein said plurality of lighting loads comprises one or more natural lighting loads.

11. The system according to claim 1, wherein said plurality of lighting loads comprises one or more 4–20 mA driver loads.

12. The system according to claim 1, wherein said database comprises a plurality of fields for storing the following information: node ID, current lux reading, average lux reading.

13. A system for measuring and controlling the level of light in an area, comprising:
  a plurality of lux sensors for communicating over an automation system network;
  a plurality of lighting loads for communicating over said automation system network, said plurality of lighting loads for illuminating one or more regions of said area; and
  control means for receiving lux readings transmitted from said plurality of lux sensors via said automation system network, said control means for storing said lux readings in a database maintained therein, assign a weight factor to readings received from each lux sensor, average said weighted lux readings so as to control the light output of said plurality of lighting loads in response thereto, said plurality of lighting loads controlled by said control means via said automation system network.

14. The system according to claim 13, wherein said automation system network comprises the LonWorks automation system.

15. The system according to claim 13, wherein said automation system network comprises the CEBus automation system.

16. The system according to claim 13, wherein said plurality of lighting loads comprises one or more relay lighting loads.

17. The system according to claim 13, wherein said plurality of lighting loads comprises one or more 0–10 V lighting loads.

18. The system according to claim 13, wherein said plurality of lighting loads comprises one or more triac loads.

19. The system according to claim 13, wherein said plurality of lighting loads comprises one or more dimmer loads.

20. The system according to claim 13, wherein said plurality of lighting loads comprises one or more incandescent loads.

21. The system according to claim 13, wherein said plurality of lighting loads comprises one or more fluorescent loads.

22. The system according to claim 13, wherein said plurality of lighting loads comprises one or more natural lighting loads.

23. The system according to claim 13, wherein said plurality of lighting loads comprises one or more 4–20 mA driver loads.

24. The system according to claim 13, wherein said database comprises a plurality of fields for storing the following information: node ID, current lux reading, average lux reading, weight factor and weighted average lux reading.

25. A system for measuring and controlling the level of light in an area, comprising:
  a plurality of lux sensors for communicating over an automation system network;
  a plurality of lighting loads for illuminating one or more regions of said area; and
  load controller means for connecting to and controlling the operation of said plurality of lighting loads;
  control means for receiving lux readings transmitted from said plurality of lux sensors via said automation system network, said control means for storing said lux readings in a database maintained therein, assign a weight factor to readings received from each lux sensor and to average said weighted lux readings so as to control the light output of said plurality of lighting loads in response thereto, said control means adapted to generate control messages for transmission to said load controller means via said automation system network.

26. The system according to claim 25, wherein said automation system network comprises the LonWorks automation system.

27. The system according to claim 25, wherein said automation system network comprises the CEBus automation system.

28. The system according to claim 25, wherein said plurality of lighting loads comprises one or more relay lighting loads.

29. The system according to claim 25, wherein said plurality of lighting loads comprises one or more 0–10 V lighting loads.

30. The system according to claim 25, wherein said plurality of lighting loads comprises one or more triac loads.

31. The system according to claim 25, wherein said plurality of lighting loads comprises one or more dimmer loads.

32. The system according to claim 25, wherein said plurality of lighting loads comprises one or more incandescent loads.

33. The system according to claim 25, wherein said plurality of lighting loads comprises one or more fluorescent loads.

34. The system according to claim 25, wherein said plurality of lighting loads comprises one or more natural lighting loads.

35. The system according to claim 25, wherein said plurality of lighting loads comprises one or more 4–20 mA driver loads.

36. The system according to claim 25, wherein said database comprises a plurality of fields for storing the following information: node ID, current lux reading, average lux reading, weight factor and weighted average lux reading.

37. The system according to claim 25, wherein said load controller means comprises relay driver means for controlling electrical power to one or more relay type lighting loads connected thereto.

38. The system according to claim 25, wherein said load controller means comprises 0–10 V driver means for controlling electrical power to one or more 0–10 V type lighting loads connected thereto.

39. A system for measuring and controlling the level of light in an area, comprising:
- a plurality of lux sensors connected to a first communications network;
- a plurality of lighting loads connected to a second communications network for illuminating one or more regions of said area; and
- at least one controller connected to a memory and connected to the plurality of lux sensors using the first communications network and connected to the plurality of lighting loads using the second communications network and operative to perform:
  - receiving a plurality of lux readings transmitted from each of said plurality of lux sensors via said first communications network;
  - storing at least one of said plurality of lux readings received from each of said plurality of lux sensors in said memory;
  - determining a first average for each of said plurality of lux sensors of at least two of said plurality of lux readings received; and
  - controlling said lighting loads based upon said first averages.

40. The system of claim 39 wherein each of the first averages each comprise an average of the two most recently received lux readings for each lux sensor.

41. The system of claim 40 wherein each of the first averages is recomputed for each lux reading received from each lux sensor.

42. The system of claim 39 wherein,
- the at least one controller is operative to perform:
  - determining a second average of lux readings for each of said plurality of lux sensors of an overall count number of said plurality of lux readings received; and
  - controlling said lighting loads based upon said second averages.

43. The system of claim 39 further comprising:
- a plurality of sensor subnets, each comprising at least one of the plurality of lux sensors; and
- wherein the at least one controller is further operative to perform:
  - determining a third average for each of said sensor subnets comprising an average of at least two of said plurality of lux readings received for each of said lux sensors in each sensor subnet; and
  - controlling said lighting loads based upon said third averages.

44. A system for measuring and controlling the level of light in an area, comprising:
- a plurality of lux sensors connected to a first communications network;
- a plurality of lighting loads connected to a second communications network for illuminating one or more regions of said area; and
- at least one controller connected to a memory and connected to the plurality of lux sensors using the first communications network and connected to the plurality of lighting loads using the second communications network and is operative to perform:
  - receiving a plurality of lux readings transmitted from each of said plurality of lux sensors via said first communications network;
  - storing at least one of said plurality of lux readings received from each of said plurality of lux sensors in said memory;
  - obtaining a weight factor for each of said plurality of lux sensors;
  - determining a first weighted average for each of said plurality of lux sensors of at least two said plurality of lux readings received using said weight factor; and
  - controlling said lighting loads based upon said first weighted averages.

45. The system of claim 44 wherein,
the weight factor for each of said plurality of lux sensors is related to the physical location of the lux sensor in the area.

46. A method of measuring and controlling the level of light in an area having a plurality of lighting loads, the method, comprising:
- receiving a plurality of lux readings transmitted from each of a plurality of lux sensors;
- storing at least one of said plurality of lux readings received from each of said plurality of lux sensors in a memory;
- obtaining a weight factor for each of said plurality of lux sensors;
- determining a first weighted average for each of said plurality of lux sensors of at least two said plurality of lux readings received using said weight factor; and
- controlling said lighting loads based upon said first weighted averages.

* * * * *